United States Patent
Kurian et al.

(10) Patent No.: US 10,628,598 B2
(45) Date of Patent: Apr. 21, 2020

(54) DYNAMIC NETWORK CONNECTIONS FOR DATA ACCESS CONTROL AND INFORMATION SECURITY

(71) Applicant: BANK OF AMERICA CORPORATION, Charlotte, NC (US)

(72) Inventors: Manu J. Kurian, Dallas, TX (US); Thomas A. Sodano, New York, NY (US); William McCann, Shirley, MA (US); Paul G. Roscoe, Treuddyn (GB)

(73) Assignee: Bank of America Corporation, Charlotte, NC (US)

( * ) Notice: Subject to any disclaimer, the term of this patent is extended or adjusted under 35 U.S.C. 154(b) by 269 days.

(21) Appl. No.: 15/861,349

(22) Filed: Jan. 3, 2018

(65) Prior Publication Data

US 2019/0205557 A1 Jul. 4, 2019

(51) Int. Cl.
*G06F 21/62* (2013.01)
*H04L 29/06* (2006.01)

(52) U.S. Cl.
CPC ...... *G06F 21/6218* (2013.01); *H04L 63/0428* (2013.01); *H04L 63/083* (2013.01); *H04L 65/1069* (2013.01)

(58) Field of Classification Search
None
See application file for complete search history.

(56) References Cited

U.S. PATENT DOCUMENTS

| | | | |
|---|---|---|---|
| 7,249,176 B1 * | 7/2007 | Salas | G06F 21/105 709/225 |
| 7,284,017 B2 | 10/2007 | Baune | |
| 7,389,311 B1 | 6/2008 | Crescenti et al. | |
| 7,487,009 B2 | 2/2009 | Trimmer et al. | |
| 7,873,702 B2 | 1/2011 | Shen et al. | |
| 8,316,197 B1 | 11/2012 | Parker et al. | |
| 8,527,947 B2 | 9/2013 | Clemm | |
| 8,607,196 B2 | 12/2013 | Clemm | |
| 8,751,454 B1 | 6/2014 | Bushman et al. | |
| 8,751,457 B2 | 6/2014 | Grigg et al. | |
| 8,819,370 B1 | 8/2014 | Parker et al. | |
| 8,825,604 B2 | 9/2014 | Draese et al. | |
| 9,235,579 B1 | 1/2016 | Suarez | |

(Continued)

*Primary Examiner* — J. Brant Murphy
*Assistant Examiner* — Hassan Saadoun
(74) *Attorney, Agent, or Firm* — Michael A. Springs

(57) ABSTRACT

A system that includes a network device, an access controller, and a data vault. The network device is configured to receive a first tokenized sub-string, combine a second tokenized sub-string with the first tokenized sub-string to generate an initiation token, and send the initiation token to the access controller. The access controller is configured to validate the initiation token and to send connection information comprising a connection identifier to the network device and send a post-action verification token to a data vault in response to validating the initiation token. The network device is further configured to send a network connection request comprising the connection identifier to the data vault. The data vault is configured to receive the network connection request, determine that the post-action verification token linked the connection identifier has been received, establish a network connection with the network device, and exchange data with the network device.

20 Claims, 2 Drawing Sheets

(56) References Cited

U.S. PATENT DOCUMENTS

| | | |
|---|---|---|
| 9,286,300 B2 | 3/2016 | Draese et al. |
| 9,639,538 B2 | 5/2017 | Fabijancic et al. |
| 9,690,789 B2 | 6/2017 | Dwivedi |
| 2010/0011431 A1* | 1/2010 | Cynkin ............... G06F 21/6218 726/9 |

* cited by examiner

DYNAMIC NETWORK CONNECTIONS FOR DATA ACCESS CONTROL AND INFORMATION SECURITY

TECHNICAL FIELD

The present disclosure relates generally to information security, and more specifically to a system using dynamic network connections for data access control.

BACKGROUND

In a network environment, network devices are in data communication with other network devices that may be distributed anywhere in the world. These network environments allow data (e.g. files) to be shared among network devices. One of the technical challenges that occurs when data is exchanged between network devices is controlling data leakage, unauthorized access to data, and preventing malicious activities. Data storing network devices, such as databases and file repositories, are vulnerable to online attacks while they are connected to other network devices to exchange data. This vulnerability poses several network security challenges. In conventional systems, if a network device becomes compromised (e.g. hacked) by a malicious actor, data storing network devices connected to compromised network devices are vulnerable to attacks because existing connections between the compromised network device and the data storing network devices can be used to exfiltrate data and/or to upload malicious data.

It is desirable to provide a solution that offers increased network security while allowing network devices to securely communicate with data storing network devices.

SUMMARY

One of the technical challenges that occurs when data (e.g. files) is exchanged between network devices is controlling data leakage, unauthorized access to files, and preventing malicious activities. Data storing network devices, such as databases and file repositories, are vulnerable to online attacks while they are connected to other network devices. This vulnerability poses several network security challenges. In conventional systems, if a network device becomes compromised (e.g. hacked) by a malicious actor, data storing network devices connected to compromised network devices are vulnerable because existing connections between the compromised network device and the data storing network devices can be used to exfiltrate data and/or to upload malicious data. This technical challenge is inherent to computer networks that allow data to be stored and accessed online. In conventional systems, data storing network devices are readily accessible to other network devices in the network. In these types of systems, data storing network devices typically have no way of detecting or determining whether a network device requesting a data exchange has been compromised. As a result, data storing network devices and their data are vulnerable to online attacks in a network environment.

In contrast to these conventional systems, the system described in the present application provide a technical solution that enhances network security and data access control by replacing at least some of the constant connections between the network devices and data storing network devices to control access to stored data. The system is configured such that a network device and data storing network devices use dynamic network connections and are not always connected to each other. In other words, network connections are created dynamically, in place of constant connections between network devices and data storing network devices. In one embodiment, network devices are unaware of the identity and/or address of data storing network devices until connection information is received from an access controller. In this example, a compromised network device is unable to identify or establish a network connection with data storing devices because a connection doesn't currently exist between the compromised network device and the data storing device and the connection information for the data storing device is unknown. This configuration provides a technical advantage by preventing compromised network devices from being able to identify and/or establish network connections with data storing devices. A network device has to first be authenticated by an access controller before being able to request a network connection and/or a data exchange with a data storing network device. In this configuration, the access controller provides additional network security by screening network devices that request to access a data storing network device.

Unlike conventional systems, where network devices are able to freely communicate with data storing network devices, this process uses an unconventional approach where network devices first have to be authenticated with an access controller before receiving connection information that allows the network devices to communicate with a data storing device. This process provides enhanced network security which allows data storing network devices to confidently accept and process network connection requests and/or data exchange requests without having to determine whether a network device is compromised.

In one embodiment, network devices are unable to communicate with the access controller until the access controller initiates communication with a network device. This configuration provides additional network security and data access control by controlling the network device's ability to access and communicate with the access controller to request connection information.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
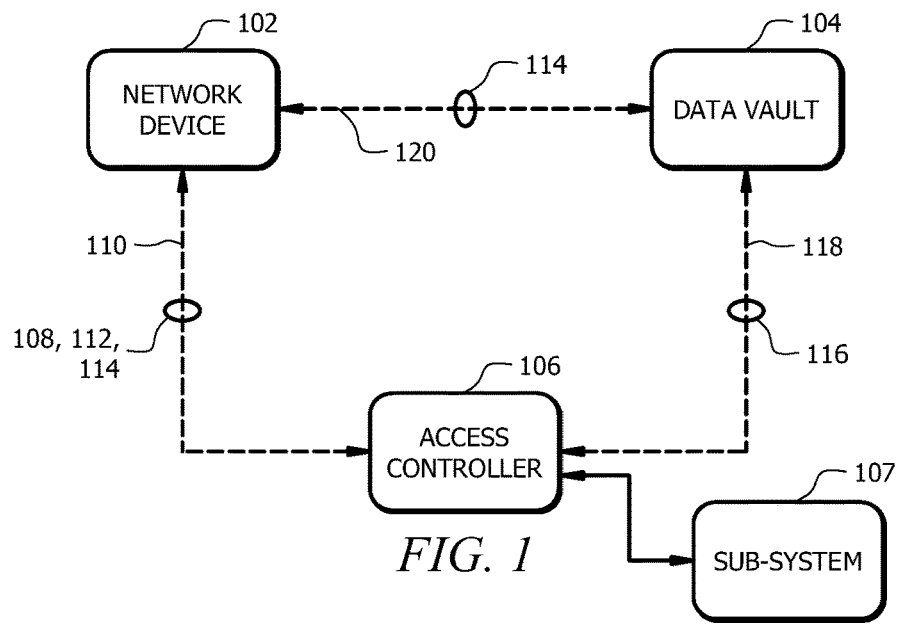
FIG. 1 is a schematic diagram of an embodiment of a network system configured to employ dynamic data access control between a network device and a data vault.

FIG. 1 is a schematic diagram of an embodiment of a network system 100 configured to employ dynamic data access control between a network device 102 and a data vault 104. In a conventional system, if the network device 102 becomes compromised (e.g. hacked) by a malicious actor, the data vault 104 connected to the compromised network device 102 is vulnerable to online attacks by the malicious actor who is able to use existing connections between the network device 102 and the data vault 104 to exfiltrate data and/or to upload malicious data. In contrast to these conventional systems, network system 100 is configured such that the network device 102 and the data vault 104 use dynamic network connections, in place of at least some constant connections. In other words, network connections can be created dynamically in place of constant connections between the network device 102 and the data vault 104. In one embodiment, the network device 102 is unaware of the identity and/or address of the data vault 104 until connection information is received from the access controller 106. In this example, a compromised network device is unable to identify or establish a network connection with the data vault 104 because of the lack of constant connections and the connection information for the data vault 104 is unknown. This configuration provides enhanced network security and data access control by using dynamic connections, in place of constant connections between the network device 102 and the data vault 104 to control access to the data vault 104.

In one embodiment, the network device 102 and the access controller 106 are configured such that the access controller 106 initiates communications between the network device 102 and the access controller 106. In other words, the network device 102 is unable to communicate requests to the access controller 106 until the access controller 106 communicates with the network device 102. This configuration provides additional network security and data access control by controlling the network device's 102 ability to access and communicate with the access controller 106 to request connection information for the data vault 104.

In one embodiment, a user or a device (not shown) may use network device 102 to exchange data with data vault 104. For example, the network device 102 may be used to download or access data stored in the data vault 104. As another example, the network device 102 may be used to upload or store data in the data vault 104. In one embodiment, the network device 102, the data vault 104, and the access controller 106 may be members of the same network. The network may be any suitable type of wireless and/or wired network including, but not limited to, all or a portion of a public network, a private network, the Internet, an Intranet, a peer-to-peer network, the public switched telephone network, a cellular network, and a satellite network. The network may be configured to support any suitable communication protocols and/or connection types (e.g. wired or wireless connections) as would be appreciated by one of ordinary skill in the art upon viewing this disclosure. In another embodiment, one or more of the network device 102, the data vault 104, and the access controller 106 may be members of different networks.

The access controller 106 is configured to be in signal communication with the network device 102 and the data vault 104 using network connections 110 and 118, respectively. The network device 102 and the data vault 104 are configured to be in signal communication with each other using a dynamic network connection 120. In one embodiment, the dynamic network connection 120 is a network connection that is not always available and is created on demand. Information for establishing the dynamic network connection 120 is provided by the access controller 106. An example of the process for establishing the dynamic network connection 120 is described in FIG. 3. In one embodiment, the network device 102 and the data vault 104 are configured to break or disconnect the dynamic network connection 120 after exchanging data, after a predetermined amount of time has elapsed, or after any other suitable condition is satisfied. Network connections 110, 118, and 120 may be any suitable type of network connection as would be appreciated by one of ordinary skill in the art. The network device 102, the data vault 104, and the access controller 106 may be configured to communicate with each other using any suitable messaging technique or protocol as would be appreciated by one of ordinary skill in the art upon viewing this disclosure. In one embodiment, the network device 102, the data vault 104, and/or the access controller 106 may be configured to encrypt data before its communicate to another device. Any suitable encryption technique may be used as would be appreciated by one of ordinary skill in the art.

Examples of the network device 102 include, but are not limited to, web clients, web servers, routers, desktop computers, mobile phones, tablet computers, laptop computers, and/or any other suitable type of device. The network device 102 is generally configured to generate initiation tokens 108 that are used to initiate the process for requesting access and permission to perform a data transfer with the data vault 104. Initiation tokens 108 may be any suitable type (e.g. alphanumeric or binary) and/or format of token. As an example, the network device 102 is configured to generate an initiation token 108 and sends the initiation token 108 to the access controller 106 via network connection 110. In response to sending the initiation token 108, the network device 102 is configured to receive connection information 112 for data vault 104 that comprises a connection identifier 114. A connection identifier 114 is a unique identifier that represents a network device 102 has passed authentication and is approved to request a network connection and/or a data exchange. Examples of connection identifiers include, but are not limited to, tokens, alphanumeric identifiers, keys, or any other suitable type of identifier. The network device 102 is configured to use the connection information 112 and the connection identifier 114 to establish communications with the data vault 104 and to facilitate a data transfer with the data vault 104. For example, when the data vault 104 receives the connection identifier 114, the data vault 104 is able to use the connection identifier 114 to quickly confirm whether the network connection request and/or data exchange request has be pre-approved by the access controller 106. An example of the network device 102 in operation is described in FIG. 3.

The access controller 106 may be any suitable type of network device or network controller. In one embodiment, the access controller 106 is a standalone device. In another embodiment, the access controller 106 or its functionality may be integrated within another network device. Additional information about the access controller 106 is described in FIG. 2. The access controller 106 is generally configured to validate or authenticate a network device 102 based on an initiation token 108 and to provide connection information 112 to the network device 102 which allows the network device 102 to locate and/or establish communications with the data vault 104. The access controller 106 is also configured to send a post-action verification token 116 to the data vault 104 via network connection 118 which notifies the data vault 104 about a pre-approved network connection and data transfer. Post-action verification token 116 may be any suitable type (e.g. alphanumeric or binary) and/or format of token. An example of the access controller 106 in operation is described in FIG. 3.

In some embodiments, the access controller 106 is connected to one or more sub-systems 107. Examples of sub-systems 107 include, but are not limited to, an email address database, personal information database, and a log-in system. The access controller 106 may be configured to use limited access connections. For example, the access controller 106 may be configured to use an inbound only connection for communicating with a sub-system 107 for an email database. An inbound connection is configured to only receive data or information. In other words, the access controller 106 only receives data when it is sent by the sub-system 107. As another example, the access controller 106 may be configured to use an outbound only connection for communicating with a sub-system 107. An outbound only connection is configured to only send data or information. In other words, the access controller 106 is only able to send data to the sub-system 107 and does not receive data from the sub-system 107. In other examples, the access controller 106 may use any other type or combination of connections that allow the access controller 106 to send and receive data from a sub-system 107.

Examples of the data vault 104 include, but are not limited to, a database, a file repository, a software as a service (SaaS) server, a web server, a file hosting server, or any other suitable type of network device. The data vault 104 generally comprises a processor, a network interface, memory, and any other suitable hardware or software. For example, the data vault 104 may comprise a processor, memory, and network interface, similar to the processor 202, the memory 204, and network interface 206 described in FIG. 2. The data vault 104 is generally configured to establish network connection 120 with the network device 102 and to exchange (i.e. send and/or receive) data with the network device 102. For example, the data vault 104 may be configured to receive data from the network device 102 and to store the received data. As another example, the data vault 104 may be configured to send data to the network device 102. In some embodiments, the data vault 104 may be configured to periodically rotate or change connection information. For example, the data vault 104 may be configured periodically change its Internet protocol (IP) address. An example of the data vault 104 in operation is described in FIG. 3.

Figure 2:
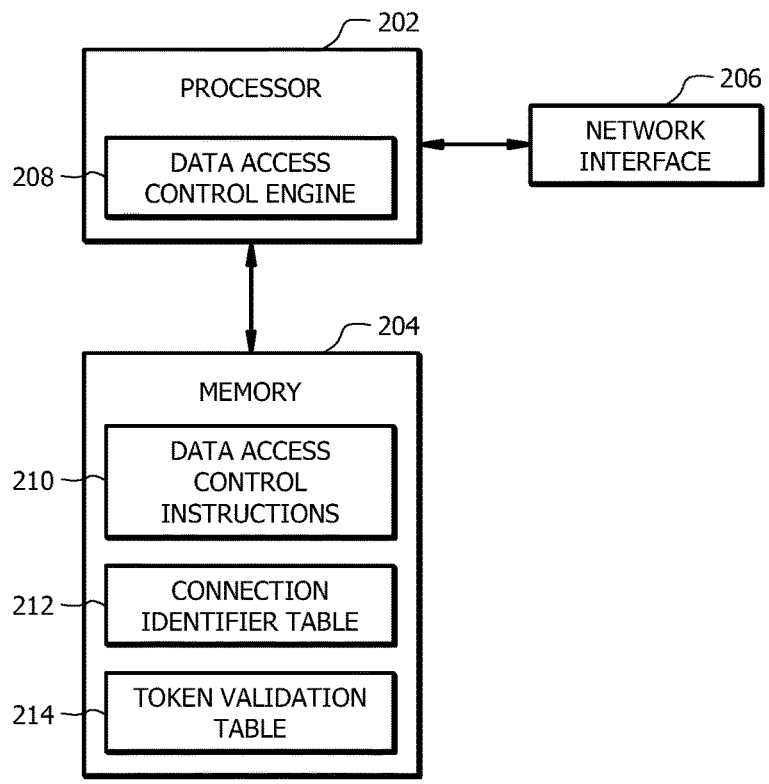
FIG. 2 is a schematic diagram of an embodiment of an access controller used in the network system.

FIG. 2 is a schematic diagram of an embodiment of an access controller 106. The access controller 106 comprises a processor 202, a memory 204, and a network interface 206. The access controller 106 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a data access control engine 208. In an embodiment, the data access control engine 208 is implemented using logic units, FPGAs, ASICs, DSPs, or any other suitable hardware.

In one embodiment, the data access control engine 208 is configured to validate or authenticate a network device 102 based on an initiation token 108 and to provide connection information 112 to the network device 102 which allows the network device 102 to locate and/or establish communications with the data vault 104. In this configuration, the data access control engine 208 provides improved network security and data access control by using dynamic network connections to control communications between the network device 102 and the data vault 104. The network device 102 is unable to identify and/or establish communications with the data vault 104 until the network device 102 receives connection information 112 from the access controller 106. This configuration can be used to replace constant connections that are typically used in conventional system which can be used when the network device 102 is compromised.

The data access control engine 208 is also configured to send a post-action verification token 116 to the data vault 104 via network connection 120 which notifies the data vault 104 about a pre-approved network connection and data transfer. This configuration adds another layer of network security by notifying the data vault 104 about impending network connection request and data transfer request. This notification allows the data vault 104 to only process known and trusted data transfer requests which improves network security. In addition, because the data vault 104 can trust known data transfer requests, the data vault 104 is able to reduce the amount of time used for validating and processing data transfer requests which reduces latency and increases the data throughput. An example of the data access control engine 208 operating in this configuration is described in FIG. 3.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise read-only memory (ROM), random-access memory (RAM), ternary content-addressable memory (TCAM), dynamic random-access memory (DRAM), and static random-access memory (SRAM). The memory 204 is operable to store data access control instructions 210, connection identifier tables 212, token validation tables 214, and/or any other data or instructions. The data access control instructions 210 comprise any suitable set of instructions, logic, rules, or code operable to execute the data access control engine 208.

The connection identifier tables 212 is a data structure that provides a mapping between connection identifiers 114 and post-action verification tokens 116. For example, a connection identifier table 212 may be a table that links connection identifiers 114 with post-action verification tokens 116. In other examples, the connection identifier table 212 may be any other suitable type of data structure. In one embodiment, the connection identifier tables 212 may also link other information, such as connection information (e.g. IP address, MAC addresses, or port addresses) and initiation tokens 108, with connection identifiers 114.

In one embodiment, the connection identifier tables 212 may link initiation tokens 108 with connection identifiers 225 and post-action verification tokens 116. For example, the initiation tokens 108 may be used for decrypting data and messages that are encrypted and sent by the network device 102 using the initiation token 108.

The token validation tables 214 is a data structure that can be used to validate initiation tokens 108. For example, a token validation table 214 may be a table that identifies valid initiation tokens 108. As another example, a token validation table 214 may comprise information (e.g. hashing information) that is used to validate initiation tokens 108. In other examples, the token validation table 214 may be any other suitable type of data structure and may comprise any suitable information for validating initiation tokens 108.

The network interface 206 is configured to enable wired and/or wireless communications. The network interface 206 is configured to communicate data through the network system 100 and/or any other system or domain. For example, the network interface 206 may be configured for communication with a modem, a switch, a router, a bridge, a server, or a client. The processor 202 is configured to send and receive data using the network interface 206.

Figure 3:
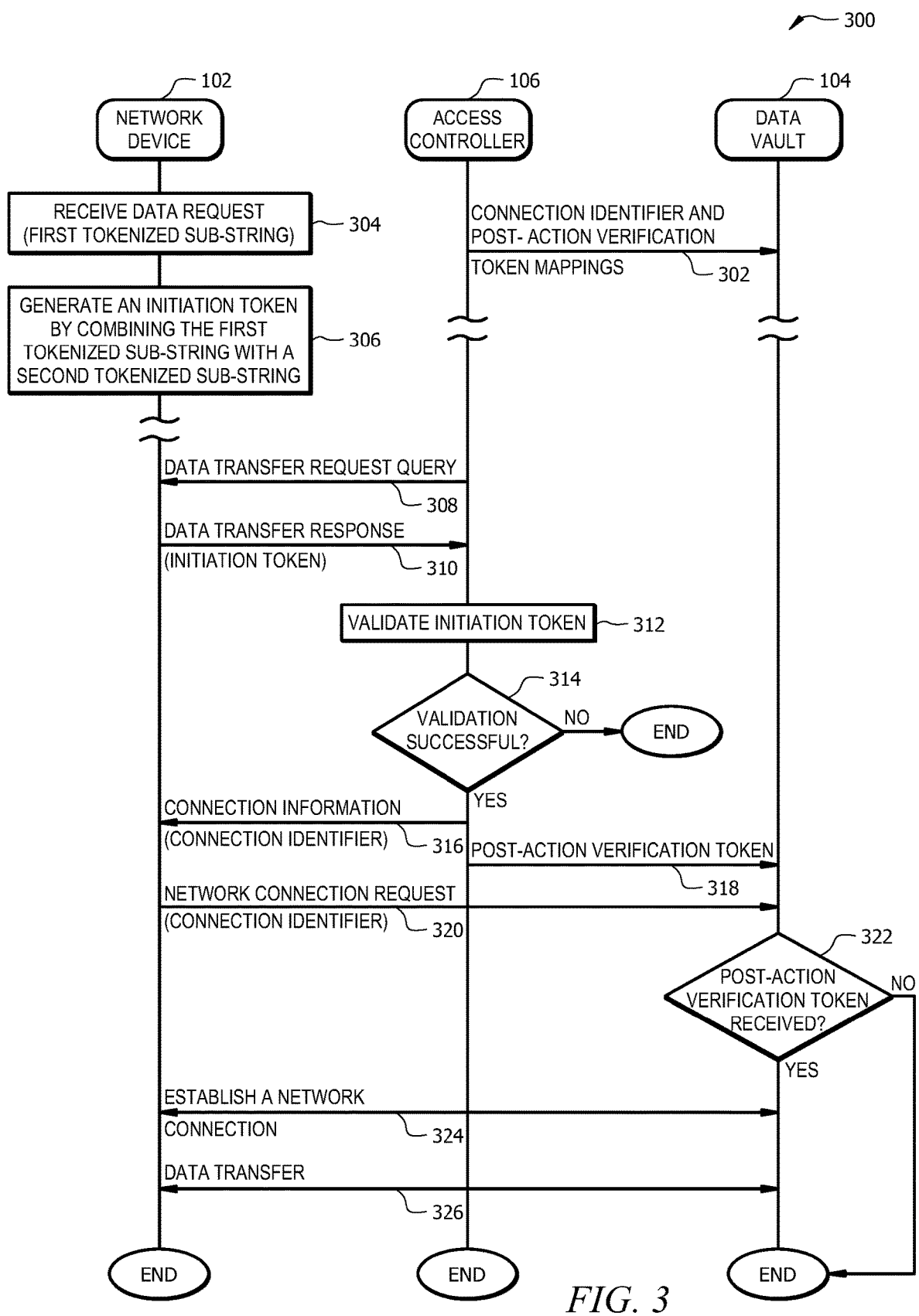
FIG. 3 is a protocol diagram of an embodiment of a dynamic data access control method.

FIG. 3 is a protocol diagram of an embodiment of a dynamic data access control method 300. The network system 100 implements method 300 to provide dynamic network connections for data access control for performing data transfers between a network device 102 and a data vault 104. A non-limiting example is provided to illustrate how the network system 100 implements method 300 to establish a dynamic network connection to facilitate a data transfer with data access control between the network device 102 and the data vault 104. For example, an operator of the network device 102 may request access to exchange (i.e. send and/or receive) data with the data vault 104. Initially, a network connection between the network device 102 and the data vault 104 does not exist.

At step 302, the access controller 106 sends connection identifiers and post-action verification tokens mappings to the data vault 104. For example, the access controller 106 may periodically send a connection identifier table 212 to the data vault 104. The connection identifier table 212 maps or links connection identifiers 114 with post-action verification tokens 116. The connection identifier table 212 may further comprise initiation tokens 108, any other information, or combinations thereof.

In one embodiment, the data vault 104 may also periodically send the access controller 106 connection information. For example, the data vault 104 may be configured to periodically change an IP address for connecting with the data vault 104. In this example, the data vault 104 sends the access controller 106 the current IP address for connecting with the data vault 104. This connection information can be shared with the network device 102 to allow the network device 102 to establish a connection with the data vault 104. In other examples, the data vault 104 may be configured to periodically change any other connection information and may send the current information for connecting to the data vault 104 to the access controller 106.

At step 304, the network device 102 receives a data request that comprises a first tokenized sub-string. The data request may be any suitable type of message or data request as would be appreciated by one of ordinary skill in the art. In one embodiment, the first tokenized sub-string is linked with an operator of the network device 102. For example, a user may authenticate themselves with the network device 102 to generate the first tokenized sub-string. As another example, a user or a device may provide (e.g. input) the first tokenized sub-string as an alphanumeric string. The first tokenized sub-string may be any suitable type and/or format of token.

At step 306, the network device 102 generates an initiation token 108 in response to receiving the first tokenized sub-string by combing the first tokenized sub-string with a second tokenized sub-string. In one embodiment, the second tokenized sub-string is linked with the network device 102. For example, the second tokenized sub-string may be based on a unique identifier (e.g. a MAC address) for the network device 102. As another example, the second tokenizes sub-string may be a token value assigned to the network device 102 by the access controller 106. The second tokenized sub-string may be any suitable type and/or format of token.

In one embodiment, the first tokenized sub-string and the second tokenized sub-string are combined by concatenating the first tokenized sub-string and the second tokenized sub-string. In another embodiment, the first tokenized sub-string and the second tokenized sub-string are combined by applying an algorithm that mix (e.g. interleaves) the first tokenized sub-string and the second tokenized sub-string. In other embodiments, the first tokenized sub-string and the second tokenized sub-string are combined using any other suitable approach or technique.

In one embodiment, the network device 102 stores the generated initiation token 108 and waits for the access controller 106 to initiation communications with the network device 102 before sending the initiation token 108 to the access controller 106. In another embodiment, the network device 102 may send the initiation token 108 to the access controller 106 upon generating the initiation token 108.

Some time later at step 308, the access controller 106 sends a data transfer request inquiry to the network device 102. In one embodiment, the access controller 106 is configured to auto-connect to the network device 102. For example, the access controller 106 is configured to periodically send data transfer request inquiries to the network device 102. In this example, the access controller 106 is configured to initiate communications with the network device 102. These data transfer request inquiries are used to check if the network device 102 has received a data request and/or a request to exchange data with the data vault 104. The data transfer request inquiries may be any suitable type of message as would be appreciated by one of ordinary skill in the art.

At step 310, the network device 102 sends a data transfer response that comprises the initiation token 108 to the access controller 106. The data transfer response may be any suitable type of message as would be appreciated by one of ordinary skill in the art. At step 312, the access controller 106 validates the initiation token 108. In one embodiment, the access controller 106 uses information from a token validation table 214 to validate the initiation token 108. For example, the access controller 106 may validate the initiation token 108 when the initiation token 108 is present in a token validation table 214. In this example, an initiation token 108 is invalid if the initiation token 108 is not present in the token validation table 214. In another embodiment, the access controller 106 may perform one or more processes (e.g. hashing) on the initiation token 108 to determine whether the initiation token 108 is valid. In other embodiments, the access controller 106 may validate the initiation token 108 using any other suitable technique.

At step 314, the access controller 106 determines whether the initiation token passed validation. The access controller 106 proceeds to step 316 in response to determining that the initiation token passes validation. Otherwise, the access controller 106 terminates method 300 in response to determining that the initiation token does not pass validation. In one embodiment, the access controller 106 sends a notification to the network device 102 that indicates that initiation token 108 has failed validation.

At step 316, the access controller 106 sends connection information 112 to the network device 102 in response to validating the initiation token 108. The connection information 112 comprises a connection identifier 114. The connection information 112 may further comprises an IP address, a MAC address, a port address, a device identifier, a time interval for connecting with the data vault 104, and/or any other suitable information for identifying and establishing communications with the data vault 104.

At step 318, the access controller 106 also sends a post-action verification token 116 to the data vault 104 in response to validating the initiation token 108. The post-action verification token 116 is used to notify the data vault 104 of a pre-approved network connection and data transfer request with the network device 102 using the connection identifier 114 that is linked with the post-action verification token 116. In one embodiment, the data vault 104 may set a flag (e.g. flag bit) in a connection identifier table 212 to indicate that the post-action verification token 116 has been received. This flag may be used later by the data vault 104 when a connection identifier 114 is received to determine whether the corresponding post-action verification token 116 has been received. An example of this process is described in step 322. In other examples, the data vault 104 may use any other suitable mechanism for indicating that a post-action verification token 116 has been received.

At step 320, the network device 102 sends a network connection request comprising the connection identifier 114 to the data vault 104. The network device 102 uses at least a portion of the received connection information 112 to initiate communications with the data vault 104. The network device 102 sends the connection request to initiate the process for establishing a dynamic network connection for exchanging data. The data vault 104 receives the network connection request comprising the connection identifier 114 from the network device 102.

At step 322, the data vault 104 determines whether the post-action verification token 116 linked with the connection identifier 114 has been received. The data vault 104 may use the connection identifier 114 to check a connection identifier table 212 to determine whether the post-action verification token 116 linked with the connection identifier 114 has been received. For example, the data vault 104 may check whether a flag has been set in the connection identifier table 212 that indicates whether a post-action verification token 116 has been received. In one embodiment, the data vault 104 is configured to only communicate (e.g. respond) with network devices 102 that send a connection identifier 114 linked with a previously received post-action verification token 116. The data vault 104 proceeds to step 324 in response to determining that the post-action verification token 116 linked with the connection identifier 114 has been received. Otherwise, the data vault 104 terminates method 300 in response to determining that the post-action verification token 116 linked with the connection identifier 114 has not been received yet.

At step 324, the data vault 104 establishes a network connection with the network device 102 in response to determining that the post-action verification token 116 linked with the connection identifier 114 has been received. The network device 102 and the data vault 104 may establish any suitable type of network connection, for example, a hypertext transfer protocol (HTTP) or a hypertext transfer protocol secure (HTTPS) connection. Data can be exchanged between the network device 102 and the data vault 104 once the network connection has been established.

In one embodiment, the data vault 104 may only communicate with the network device 102 within a specified time interval or window. In this embodiment, the data vault 104 determines whether the specified time interval has lapsed prior to establishing the network connection with the network device 102. In one embodiment, the data vault 104 may set a timer for a time interval upon receiving the post-action verification token 116 from the access controller 106. For example, the data vault 104 may set a timer for 5 minutes, 30 minutes, 1 hour, or any other suitable duration of time. In response to receiving a connection identifier 114 from the network device 102, the data vault 104 first determines that the specified time interval has not lapsed prior to establishing the network connection with the network device 102. In other words, the data vault 104 determines that that the timer has not expired before establishing the connection with the network device 102.

At step 326, the network device 102 and the data vault 104 exchange data using the established network connection (e.g. network connection 120). For example, the network device 102 may download or access data stored in the data vault 104 upon establishing the network connection. In this example, the network device 102 receives data from the data vault 104. As another example, the network device 102 may upload or store data in the data vault 104 upon establishing the network connection. In this example, the network device 102 sends data to the data vault 104 for storing. In one embodiment, the network device 102 and the data vault 104 are configured to auto-disconnect. In other words, the network device 102 and the data vault 104 are configured to break or disconnect the established network connection after exchanging data or after a predetermined amount of time has elapsed. Breaking the network connection between the network device 102 and data vault 104 provides protection to the data vault 104 in the event the network device 102 becomes compromised after the network connection is established. The network system 100 repeats the process described in method 300 for subsequent data transfer between the network device 102 and the data vault 104.

In one embodiment, the network device 102 is configured to encrypt data and messages sent to the data vault 104 using the initiation token 108. The data vault 104 may request or receive the initiation token 108 from the access controller 106. For example, the access controller 106 may send the initiation token 108 when sending the post-action verification token 116. The data vault 104 is configured to use the initiation token 108 to decrypt data and messages received from the network device 102. In one embodiment, the data vault 104 may use the connection identifier 114 sent by the network device 102 to look-up or identify the initiation token 108 for decrypting data sent by the network device 102. For example, the data vault 104 may use the connection identifier 114 as a search token to look-up the initiation token 108 in a connection identifier table 212. This process provides an additional level of network security by using the initiation token 108 generated by the network device 102 for encryption and allowing the access controller 106 to share (i.e. send) the encryption information with the data vault 104. In this example, the access controller 106 ensures that the encrypted data sent by the network device 102 can only be decrypted and accessed by the data vault 104.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A network system, comprising:
a network device configured to:
receive a first tokenized sub-string;
combine a second tokenized sub-string with the first tokenized sub-string to generate an initiation token in response to receiving the first tokenized sub-string; and
send the initiation token to an access controller;
the access controller is in signal communication with the network device, and configured to:
validate the initiation token;
send connection information comprising a connection identifier to the network device in response to validating the initiation token, wherein the connection identifier indicates the network device has passed authentication;
send a post-action verification token to a data vault in response to validating the initiation token, wherein the post-action verification token is linked with the connection identifier;
the network device is further configured to send a network connection request comprising the connection identifier to the data vault using at least a portion of the information from the connection information; and
the data vault is in signal communication with the access controller, and configured to:
receive the network connection request comprising the connection identifier from the network device;
determine that the post-action verification token linked the connection identifier has been received;
establish a network connection with the network device in response to determining that the post-action verification token linked the connection identifier has been received; and
exchange data with the network device upon establishing the network connection with the network device.

2. The system of claim 1, wherein the data vault is configured to break the network connection after exchanging data with the network device.

3. The system of claim 1, wherein:
the access controller is configured to initiate communications with the network device; and
the network device sends the initiation token in response to the access controller initiating communications with the network device.

4. The system of claim 1, wherein:
the first tokenized sub-string is linked with an operator of the network device; and
the second tokenized sub-string is linked with the network device.

5. The system of claim 1, wherein:
the data vault is configured to periodically change an IP address for connecting with the data vault;
the connection information comprises a current IP address for connecting with the data vault; and
the network device sends the network connection request using the current IP address for connecting with the data vault.

6. The system of claim 1, wherein:
the access controller is configured to send the initiation token to the data vault;
the network device is configured to encrypt data using the initiation token; and
the data vault is configured to decrypt data received from the network device using the initiation token.

7. The system of claim 1, wherein:
the connection information identifies a time interval for connecting with the data vault; and
the data vault is configured to determine the time interval has not lapsed prior to establishing the network connection with the network device.

8. A data access control method, comprising:
receiving, by an access controller, an initiation token from a network device;
validating, by the access controller, the initiation token;
sending, by the access controller, connection information comprising a connection identifier to the network device in response to validating the initiation token, wherein the connection identifier indicates the network device has passed authentication;
sending, by the access controller, a post-action verification token to a data vault in response to validating the initiation token, wherein the post-action verification token is linked with the connection identifier;
receiving, by the data vault, a network connection request comprising the connection identifier from the network device;
determining, by the data vault, that the post-action verification token linked the connection identifier has been received;
establishing, by the data vault, a network connection with the network device in response to determining that the post-action verification token linked the connection identifier has been received; and
exchanging, by the data vault, data with the network device upon establishing the network connection with the network device.

9. The method of claim 8, further comprising breaking, by the data vault, the network connection after exchanging data with the network device.

10. The method of claim 8, further comprising initiating, by the access controller, communications with the network device; and wherein the initiation token is received in response to the access controller initiating communications with the network device.

11. The method of claim 8, wherein the initiation token comprises:
a first tokenized sub-string linked with an operator of the network device; and
a second tokenized sub-string linked with the network device.

12. The method of claim 8, further comprising periodically changing, by the data vault, an IP address for connecting with the data vault; and
wherein the connection information comprises a current IP address for connecting with the data vault.

13. The method of claim 8, further comprising:
sending, by the access controller, the initiation token to the data vault; and
decrypting, by the data vault, data received from the network device using the initiation token.

14. The method of claim 8, wherein the connection information identifies a time interval for connecting with the data vault; and
further comprising determining, by the data vault, the time interval has not lapsed prior to establishing the network connection with the network device.

15. A network system, comprising:
an access controller configured to:
receive an initiation token from a network device;
validate the initiation token;
send connection information comprising a connection identifier to the network device in response to validating the initiation token, wherein the connection identifier indicates the network device has passed authentication;
send a post-action verification token to a data vault in response to validating the initiation token, wherein the post-action verification token is linked with the connection identifier; and
the data vault in signal communication with the access controller, and configured to:
receive a network connection request comprising the connection identifier from the network device;
determine that the post-action verification token linked the connection identifier has been received;
establish a network connection with the network device in response to determining that the post-action verification token linked the connection identifier has been received; and
exchange data with the network device upon establishing the network connection with the network device.

16. The system of claim 15, wherein the access controller is configured to:
initiate communications with the network device; and
the initiation token is received in response to the access controller initiating communications with the network device.

17. The system of claim 15, wherein the initiation token comprises:
a first tokenized sub-string linked with an operator of the network device; and
a second tokenized sub-string linked with the network device.

18. The system of claim 15, wherein:
the data vault is configured to periodically change an IP address for connecting with the data vault; and
the connection information comprises a current IP address for connecting with the data vault.

19. The system of claim 15, wherein:
the access controller is configured to send the initiation token to the data vault; and
the data vault is configured to decrypt data received from the network device using the initiation token.

20. The system of claim 15, wherein:
the connection information identifies a time interval for connecting with the data vault; and
the data vault is configured to determine the time interval has not lapsed prior to establishing the network connection with the network device.

* * * * *